US008031071B2

(12) United States Patent
Ogata et al.

(10) Patent No.: US 8,031,071 B2

(45) Date of Patent: Oct. 4, 2011

(54) IC TAG LABEL

(75) Inventors: Tetsuji Ogata, Tokyo-To (JP); Hideto Sakata, Akishima (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 339 days.

(21) Appl. No.: 12/444,639

(22) PCT Filed: Oct. 12, 2007

(86) PCT No.: PCT/JP2007/069947

§ 371 (c)(1), (2), (4) Date: Apr. 29, 2009

(87) PCT Pub. No.: WO2008/047705

PCT Pub. Date: Apr. 24, 2008

(65) Prior Publication Data

US 2009/0303012 A1 Dec. 10, 2009

(30) Foreign Application Priority Data

Oct. 16, 2006 (JP) ................................ 2006-280852

(51) Int. Cl.
*G08B 13/14* (2006.01)

(52) U.S. Cl. .................................. 340/572.7; 340/10.1

(58) Field of Classification Search ............... 340/572.7, 340/572.1, 10.1
See application file for complete search history.

(56) References Cited

U.S. PATENT DOCUMENTS 7,561,047 B2 * 7/2009 Ogata et al. ................ 340/572.1
2005/0236623 A1 10/2005 Takeuchi et al.
2009/0303011 A1 * 12/2009 Ogata ......................... 340/10.1

FOREIGN PATENT DOCUMENTS

JP 2000-112825 A1 4/2000
JP 2005-212356 A1 8/2005
JP 2005-311205 A1 11/2005
JP 2006-236081 A1 9/2006

* cited by examiner

*Primary Examiner* — John A Tweel, Jr.
(74) *Attorney, Agent, or Firm* — Burr & Brown

(57) ABSTRACT

An IC tag label 1A includes an inlet substrate 11; an antenna pattern 2 and an IC chip 3 which are provided on one surface of the inlet substrate 11; and an adhesive layer 6 which is mounted on the other surface of the inlet substrate 11. A release paper 7 is attached to the adhesive layer 6. An opening 12 which serves as a clearance for the IC chip 3 is provided in a portion of the release paper 7 and adhesive layer 6, the portion corresponding to the IC chip 3.

8 Claims, 4 Drawing Sheets

IC TAG LABEL

TECHNICAL FIELD

The present invention relates to an IC tag label that is structured to avoid damage to an IC chip. More specifically, the present invention relates to an IC tag label that is used, for instance, as a shipping tag attached to a baggage, packing case, or the like, a merchandise label, a product management tag, a voucher, a case, or the like, and structured to reduce the protrusion height of an IC chip section.

Consequently, the present invention is mainly applicable to the manufacture or use of IC tag labels and, more specifically, to such categories as transportation, distribution, inventory control, and plant process control of IC tag labels.

BACKGROUND ART

Noncontact IC tag labels are now frequently used as recognition media in the fields, for instance, of transportation and distribution, or used for product quality control, inventory control, and various other purposes because they can record and retain information and establish noncontact communication to exchange the information with an external device.

However, when a noncontact IC tag label is used as a distribution label, it is frequently exposed to unavoidable external stress. It is fatally damaged particularly if its IC chip section receives an impact. Therefore, a structure for protecting the IC chip section was conceived in the past to avoid such a problem. However, such a structure was complicated so that noncontact IC tags could not be manufactured at a low cost.

An unavoidable structural problem of noncontact IC tag labels is that IC chips are much greater in thickness than an employed substrate and other parts. The IC chips for IC tags have been reduced in size and thickness. However, recently manufactured IC chips have a size between 0.2 mm square and 2 mm square and a thickness between approximately 100 μm and 400 μm. Therefore, when an IC chip is mounted on a substrate with an antenna pattern formed on the substrate, even if the IC chip is covered with a surface protection member and flattened, the height of the IC chip section is remarkable when the IC tag labels are stacked.

It is conceivable that IC chips may become damaged when they are stacked. When noncontact IC tag labels are to be used, several or more than a dozen of them are often stacked. For increased ease of use, labels are usually positioned so that they are oriented in the same direction. When the labels are oriented in the same direction, the IC chips are stacked vertically aligned necessarily. If, in such an instance, a heavy object is placed on top of the labels, any one of the vertically-aligned adjacent IC chips are impacted so that the IC chips, which are silicon crystals, are damaged. In this case, the labels, although they are unused, are suspected of being defective.

In a different situation where an IC tag attached to a hard article collides with a hard object, a protruding IC chip section is most likely to receive an impact.

Patent Document 1 describes a prior application filed by the applicant of the present invention and relates to a noncontact IC tag label that is formed by inserting a thin-layer structure into the area around an IC chip for IC chip protection purposes. However, the noncontact IC tag label entails an increased production cost because of the material cost of the structure and the difficulty in inserting the structure into its position.

DISCLOSURE OF THE INVENTION

When a structure is inserted into the area around an IC chip as described in Patent Document 1, the material cost and production cost are higher than those for a normal IC tag label due to a cost increase by the insertion of the structure. In addition, the insertion of the structure increases the thickness of an IC tag label. Therefore, when such an IC tag label is attached to a commodity, surface irregularities arise due to the level difference between the IC tag label and the commodity surface. Under such circumstances, the present invention is implemented by studying the structure of a tag label, the structure providing IC chip protection without affecting the material cost and production cost and without increasing the thickness of the IC tag label.

According to a first aspect of the present invention, there is provided an IC tag label including: an inlet substrate; an antenna pattern and an IC chip which are mounted on one surface of the inlet substrate; and an adhesive layer which is mounted on the other surface of the inlet substrate; wherein a clearance for the IC chip is provided at least in a portion of the adhesive layer, the portion corresponding to the IC chip.

According to a second aspect of the present invention, there is provided the IC tag label as described in the first aspect, wherein the adhesive layer is provided with a release paper, and the clearance for the IC chip is provided in a portion of the release paper and adhesive layer, the portion corresponding to the IC chip.

According to a third aspect of the present invention, there is provided the IC tag label as described in the second aspect, wherein an opening that serves as the clearance for the IC chip is provided in a portion of the release paper and adhesive layer, the portion corresponding to the IC chip.

According to a fourth aspect of the present invention, there is provided the IC tag label as described in the second aspect, wherein a cut-out that is extended to one end edge of the release paper and adhesive layer to provide the clearance for the IC chip is made in a portion of the release paper and adhesive layer, the portion corresponding to the IC chip.

According to a fifth aspect of the present invention, there is provided the IC tag label as described in the first aspect, wherein an IC chip protection sheet is provided on one surface of the inlet substrate to cover the antenna pattern and the IC chip.

According to a sixth aspect of the present invention, there is provided the IC tag label as described in the fifth aspect, wherein the IC chip protection sheet includes a plastic sheet and a protection sheet bond layer or adhesive layer, and has a thickness between 40 nm and 200 nm.

According to a seventh aspect of the present invention, there is provided the IC tag label as described in the fifth aspect, wherein the IC chip protection sheet includes a paper substrate and a protection sheet bond layer or adhesive layer, and has a thickness between 40 nm and 200 nm.

According to an eighth aspect of the present invention, there is provided the IC tag label as described in the second aspect, wherein the thickness of the release paper and adhesive layer is between 80 μm and 200 μm.

The IC tag label according to the present invention is such that the clearance for the IC chip is provided in the release paper and adhesive layer to avoid an increase in the thickness of the portion of the IC tag label corresponding to the IC chip. Therefore, the IC chip is not likely to become damaged due to an external impact particularly before the IC tag label is attached to a commodity for use.

Further, the clearance for the IC chip is also provided in the adhesive layer. Therefore, the thickness of the portion of the IC tag label corresponding to the IC chip can be reduced even after the IC tag label is attached to a commodity with the release paper removed.

Furthermore, the IC tag label according to the present invention does not increase the material cost and production cost because it can be manufactured without any additional particular material unlike an IC tag label having a conventional configuration.

Moreover, even when the IC tag label according to the present invention is in the form of a continuously wound product, the IC chip does not become damaged due to strong pressure that is exerted by winding during manufacture or after completion of production.

BEST MODE FOR CARRYING OUT THE INVENTION

Figure 1:
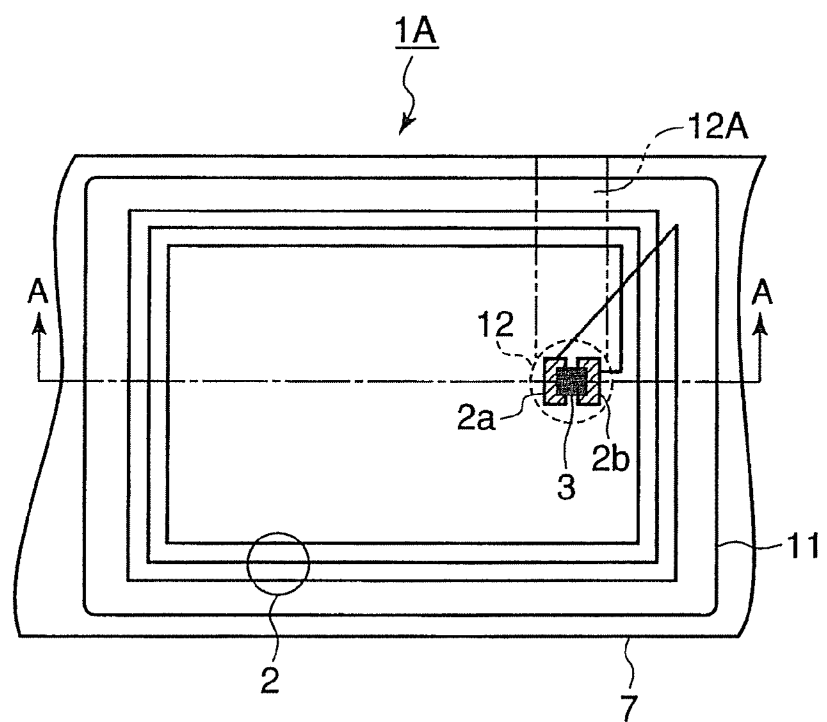
FIG. 1 is a plan view illustrating an IC tag label according to a first embodiment bf the present invention.
Figure 2:
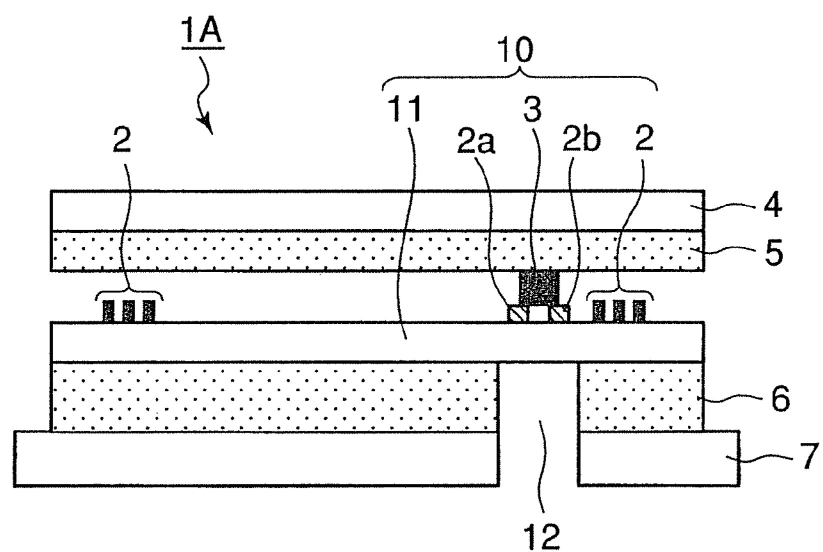
FIG. 2 is a cross-sectional view taken along line A-A in FIG. 1.
Figure 3:
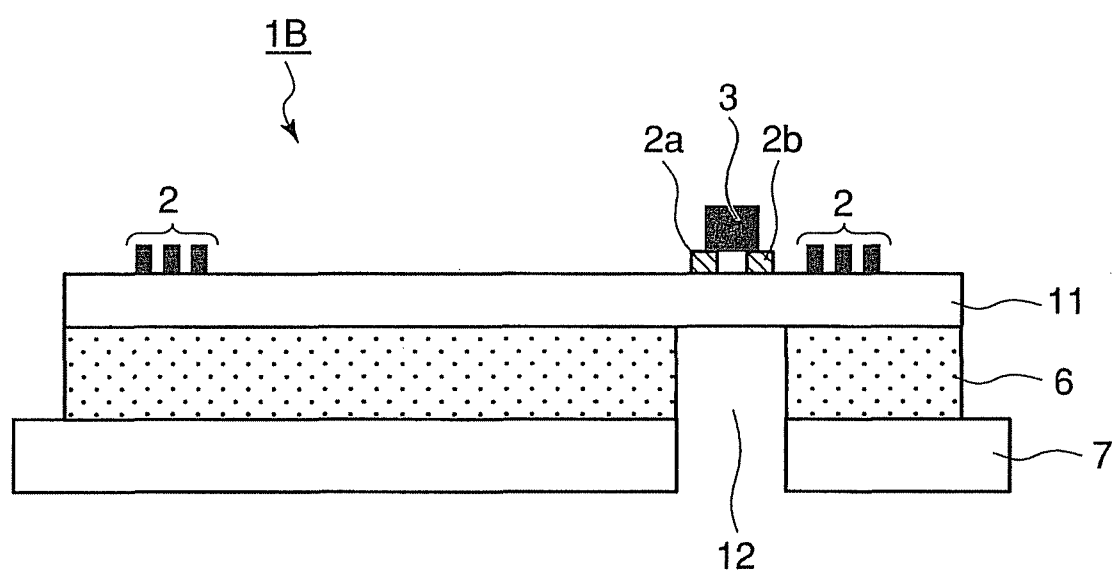
FIG. 3 is a plan view illustrating the IC tag label according to a second embodiment of the present invention.

Embodiments of the present invention will now be described sequentially with reference to the accompanying drawings. FIG. 1 is a plan view illustrating an IC tag label according to a first embodiment of the present invention. FIG. 2 is a cross-sectional view taken along line A-A in FIG. 1. FIG. 3 is a cross-sectional view illustrating the IC tag label according to a second embodiment. FIGS. 4(A) to 4(E) are diagrams illustrating a manufacturing process for the IC tag label according to the first embodiment. FIG. 5 is an external plan view of an inlet having a coil antenna.

As shown in FIGS. 1 and 2, the IC tag label 1A according to the first embodiment includes an inlet substrate 11; an antenna pattern 2 which is mounted on one surface of the inlet substrate 11 and provided with both ends 2*a*, 2*b;* and an IC chip 3 which is mounted on both ends 2*a*, 2*b* of the antenna pattern 2. Further, an adhesive layer 6 is mounted on the other surface of the inlet substrate 11. Furthermore, a release paper 7 is attached to the adhesive layer 6.

Moreover, an IC chip protection sheet 4 is mounted on the whole of one surface of the inlet surface 11 via a protection sheet bond layer or adhesive layer 5 to cover the antenna pattern 2 and IC chip 3.

When the IC chip protection sheet 4 has an adhesive property, the protection sheet bond layer or adhesive layer 5 needs not always be provided. A circular or rectangular opening 12 is formed in a portion of the adhesive layer 6 and release paper 7, the portion corresponding to the IC chip 3. This opening 12 serves as a clearance (clearance space) for the IC chip 3.

Instead of the circular or rectangular opening 12, a cut-out 12A may be formed in a portion of the adhesive layer 6 and release paper 7, the portion corresponding to the IC chip 3. The cut-out 12A extended to one end line of the adhesive layer 6 and release paper 7 provides the clearance for the IC chip 3 (two-dot chain line in FIG. 1).

The IC tag label 1A according to the present invention is characterized in that the circular or rectangular opening 12 is formed to surround the IC chip 3 and made in a portion of the release paper 7 and adhesive layer 6, the portion being directly below the IC chip 3. However, the opening 12 is not practically visible from the surface side of the IC tag label 1A because it is positioned below the inlet substrate 11.

It is assumed that the opening 12 is 3 to 10 mm in diameter when it is circular, or 3 to 10 mm square when it is square. In the case where the opening 12 is excessively small in size, the employed adhesive may flow to close the opening in the adhesive layer 6. It is therefore preferred that the opening 12 be within the above numerical value range.

Referring to FIG. 1, a portion of the IC tag label 1A, the portion being above the adhesive layer 6, is individually punched out so that the adhesive layer 6 is retained within a smaller area than the release paper 7. In some cases, however, each of the adhesive layers 6 may have no groove between adjacent units. In some other cases, the adhesive layer 6 may have the same width as that of the release paper 7. The IC tag label 1A according to the present invention may have the function of an electromagnetic induction type of planar coil antenna which is used at a frequency, for instance, of 13.56 MHz, or may have the function of a UHF-band or microwave-band dipole antenna.

FIG. 2 is a cross-sectional view taken along line A-A in FIG. 1. The adhesive layer 6 is disposed on the opposite side of the IC chip 3 and antenna pattern 2 relative to the inlet substrate 11, and protected by the release paper 7. Meanwhile, the side on which the IC chip 3 and antenna pattern 2 are disposed on the inlet substrate 11 is covered with the IC chip protection sheet 4. The IC chip protection sheet 4 is attached to the antenna pattern surface of the inlet substrate 11 via the protection sheet bond layer or adhesive layer 5. This configuration is also employed in conventional IC tag labels.

The adhesive layer 6 and release paper 7 are disposed directly below the IC chip 3. They have the opening 12 which is punched out to surround the IC chip 3 as viewed from thereabove. While the release paper 7 is attached to its position, the IC chip 3 is disposed within the opening 12. In FIG. 1, as the dimension in the thickness direction of the sheet is magnified and represented greater compared with that in the lateral direction, FIG. 1 does not exactly represent the actual state of the IC tag label 1A. Practically, as the inlet substrate 11 deforms due to its flexibility, each of the dimensions in the thickness direction of the substrate and IC chip, which is much smaller than the dimension of the opening, just fits into the opening 12.

The IC tag label 1A does not increase the thickness at the portion of the IC tag label corresponding to the IC chip section because it has the opening 12 formed in the release paper 7 and adhesive layer 6. Accordingly, the IC chip does not become damaged due to an external impact before the IC tag label 1A is attached to a commodity for use. When the IC tag label 1A is to be used, the release paper 7 is removed to let the adhesive layer 6 adhere to a commodity (target article). However, as the opening 12 is also made in the adhesive layer 6, after the release paper 7 is removed to let the adhesive layer 6 adhere to a commodity, the thickness of a portion of the IC tag label 1A, the portion corresponding to the IC chip 3, can be reduced by the thickness of the adhesive layer 6.

Although a gap is shown between the antenna pattern 2 and the bond or adhesive layer 5 in FIG. 2, practically, they are in close contact with each other.

FIG. 3 is a cross-sectional view illustrating the IC tag label according to the second embodiment. The plan view of the IC tag label according to the second embodiment is not shown because it is the same as the view shown in FIG. 1. The IC tag label 1B according to the second embodiment includes the inlet substrate 11; the antenna pattern 2 and IC chip 3 which are mounted on one surface of the inlet substrate 11; the adhesive layer 6 which is dispose on the opposite side of the IC chip 3 and antenna pattern 2 relative to the inlet substrate 11 (mounted on the other surface of the inlet substrate 11); and the release paper 7 attached to the adhesive layer 6. The opening 12 is made in a portion of the adhesive layer 6 and release paper 7, the portion being directly below the IC chip 3, and formed to surround the IC chip 3. Referring to FIG. 3, the IC chip protection sheet 4 is not attached to the surface, on which IC chip 3 and antenna pattern 2 are disposed, of the IC tag label 1B. Although the IC chip 3 and antenna pattern 2 are exposed to the air because the IC chip protection sheet is not attached, the IC tag label 1B has an adequate function of noncontact communication. The opening 12 can reduce an external impact that the IC chip 3 may receive.

An adequate protection function is fulfilled when the total thickness of the release paper 7 and adhesive layer 6 is substantially equal to the thickness of an actually used IC chip 3 (approximately 100 μm to 200 μm). However, a certain protection effect can be obtained even when the total thickness of the release paper 7 and adhesive layer 6 is equivalent to that of conventional release paper 7 and adhesive layer 6. The reason is that a certain decrease in the thickness of the portion of the IC tag label corresponding to the IC chip may make the pressure applied to the IC chip 3 to be reduced. The total thickness of conventional release paper 7 and adhesive layer 6 generally ranges from approximately 80 μm to 200 μm. Using the same materials as those for the conventional release paper 7 and adhesive layer 6 makes it possible to avoid an increase in the material cost.

FIG. 5 is an external plan view of an inlet having a coil antenna. The inlet shown in this figure is similar to an actual product. This figure is obtained when a transparent inlet substrate 11 is viewed from back surface side thereof (from the side facing the release paper 7).

The antenna pattern 2 is formed on the inlet substrate 11, and the IC chip 3 is mounted on both ends 2*a*, 2*b* of the antenna pattern 2. A conductive member 8 is provided as a back-surface circuit that can prevent a short circuit from being formed with respect to the antenna pattern 2. The antenna pattern 2 is formed by etching a laminated foil of metal (aluminum, copper, etc.) into the inlet substrate 11. As the metal foil thickness ranges from approximately 10 μm to 40 μm, the metal foil is thinner than the IC chip 3. The profile of the coil for a unit IC tag label 1 varies in size and measures, for instance, 40 mm by 45 mm or 45 mm by 75 mm. It should be noted that the present invention is also applicable to a dipole antenna (not shown). When a half-wave dipole antenna is used, its overall length is limited to 4 inches.

The sheet composed of the inlet substrate 11, antenna pattern 2, and IC chip 3 is generally called an inlet 10 or an inlet base 10.

<Materials>

(1) Inlet Substrate 11

A wide variety of plastic films may be used. One of the following films or a complex film made of the following films may be used.

The film to be used may be made, for instance, of polyethylene terephthalate (PET), PET-G (terephthalic acid-cyclohexane dimethanol-ethylene glycol copolymer), polyvinyl chloride, vinyl chloride-vinyl acetate copolymer, polycarbonate, polyamide, polyimide, cellulose diacetate, cellulose triacetate, polystyrene, ABS, polyacrylic acid ester, polypropylene, polyethylene, or polyurethane.

(2) IC Chip Protection Sheet 4

For example, high-quality paper, coated paper, or synthetic paper may be used. In addition, the same materials as for the plastic film for the inlet substrate may be used. The total thickness of the IC chip protection sheet 4 and protection sheet bond layer or adhesive layer 5 is between 40 nm and 200 nm.

(3) Release Paper 7

A low peel strength material obtained by applying a low contact angle chemical (silicone under normal conditions) to a paper substrate is used. For example, high-quality paper, kraft paper, glassine paper, parchment paper, or super-calendared paper is used as the paper substrate, after directly being coated with silicone or after sequentially being coated with polyethylene, clay binder, and silicone. PET, OPP (biaxially-stretched polypropylene, or PE is directly used as a release paper substrate or used after being coated with silicone.

(4) Adhesive Layer 6 and Protection Sheet Bond Layer or Adhesive Layer 5

In this document the bond is, for instance, of a solvent type, a cured type, an ultraviolet curable type, an emulsion type, or a hot-melt type, and includes a so-called adhesive type. The reason is that an intended purpose is achieved as far as target materials are attached to each other no matter what type is employed.

Further, in this document the adhesive does not exhibit a remarkable gradual increase in viscosity and maintains intermediate ever-tacky state. The bond and adhesive may be made of various resin components such as natural rubber, nitrile rubber, epoxy resin, vinyl acetate emulsion, polyester, acrylic, acrylic acid ester copolymer, polyvinyl alcohol, and phenol resin.

A method of manufacturing the IC tag label according to the present invention will now be described. The IC tag label according to the present invention can be manufactured by substantially the same method as that for conventional IC tag labels. However, the IC tag label according to the present invention is characterized in that the opening 12 is formed in the release paper 7 and adhesive layer 6. Therefore, the IC tag label according to the present invention is to be manufactured with such characteristics taken into account.

FIGS. 4(A) to 4(E) are diagrams illustrating a manufacturing process for the IC tag label 1A according to the first embodiment. First, as with a conventional process, after the inlet (with the IC chip 3 mounted on the antenna pattern 2 on the inlet substrate 11) 10 (FIG. 4(A)) is manufactured, the release paper 7 on which the adhesive layer 6 is coated (FIG. 4(B)) is laminated to the opposite side of the surface on which the antenna pattern 2 of the inlet 10 is disposed. In this instance, the opening 12 is formed beforehand by penetrating the release paper 7 and adhesive layer 6, and the release paper 7 and adhesive layer 6 are laminated to the inlet 10 with the opening 12 aligned with the IC chip 3. Under normal conditions, the opening 12 is made by punching the adhesive layer 6 with the release paper 7 attached to both surfaces thereof. Alternatively, after a double-coated adhesive tape (adhesive layer) 6, both surfaces thereof being covered with release papers 7, is punched out, the release paper 7 and the adhesive layer 6 may be laminated to the inlet 10 while the other side of release paper 7 is being removed. The opening 12 may be formed with a rotary die cutter or a flat punch blade.

Figure 4:
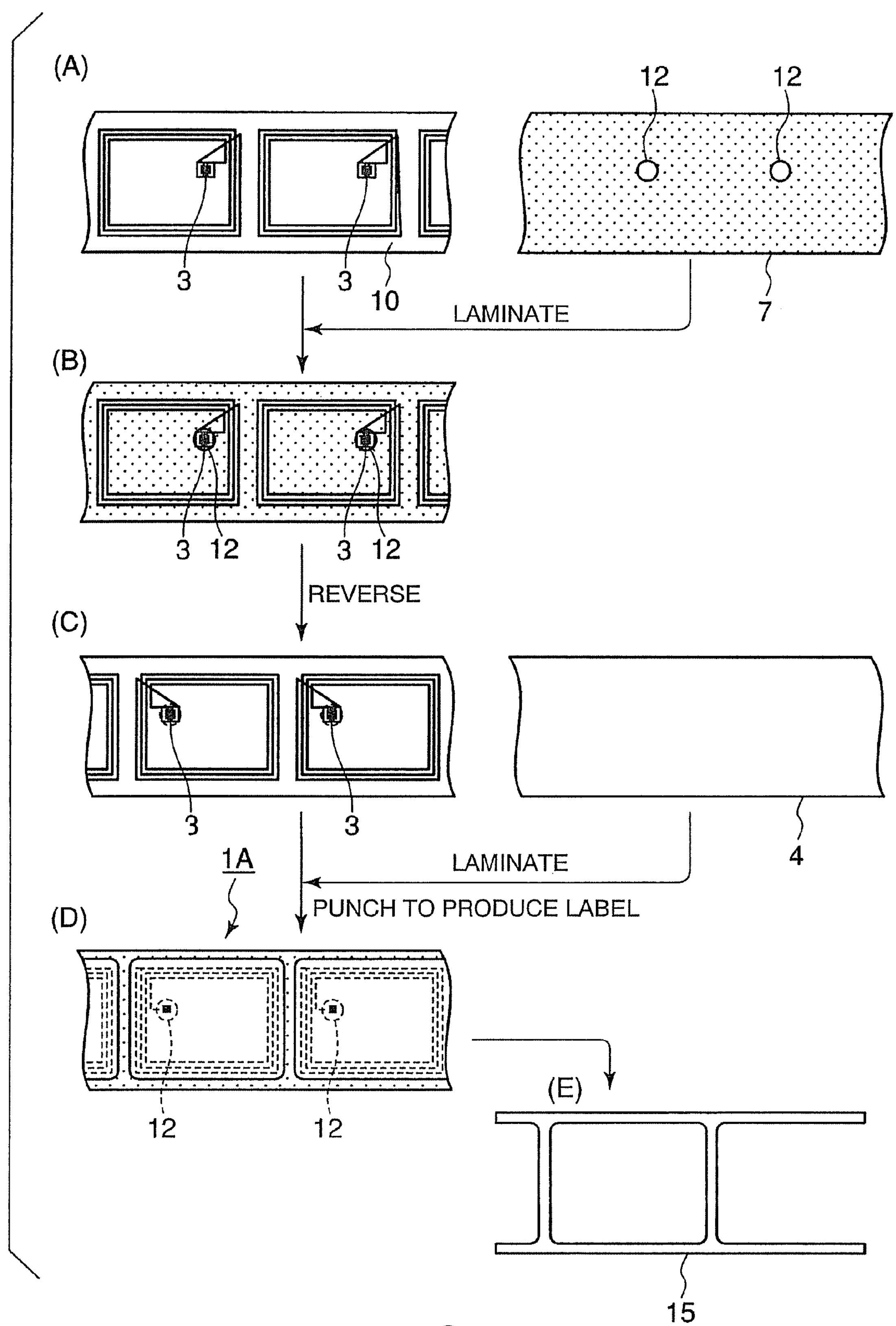
FIGS. 4(A) to 4(E) are diagrams illustrating a manufacturing process for the IC tag label according to the first embodiment.
Figure 5:
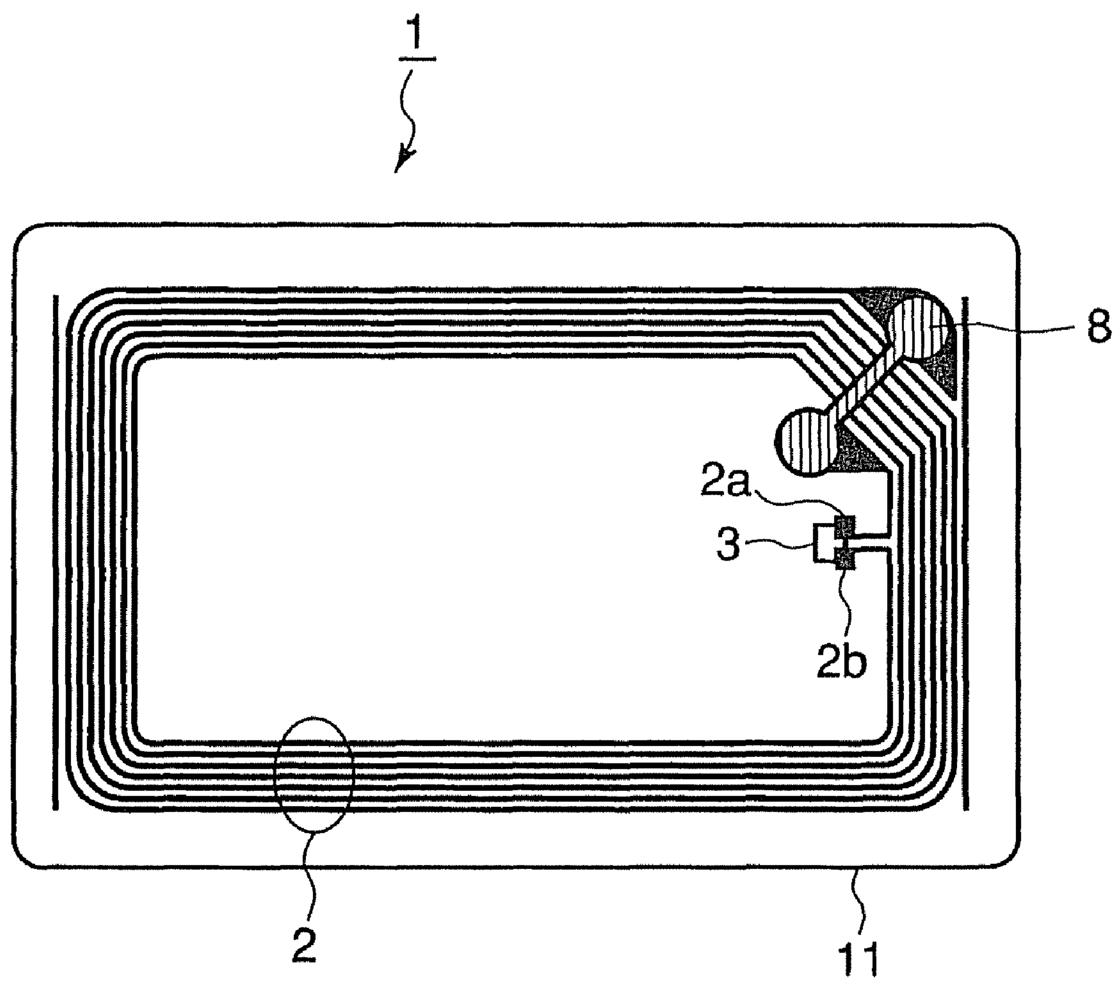
FIG. 5 is an external plan view of an inlet having a coil antenna.

Then, with the inlet 10 reversed (FIG. 4(C)), the IC chip protection sheet 4 is laminated to the antenna pattern side surface of the inlet substrate 11 via the protection sheet bond or adhesive 5. Next, a laminate composed of the release paper 7, inlet 10, and IC chip protection sheet 4 is punched to produce unit IC tag labels (FIG. 4(D)). In this manner, the IC tag label 1A is formed as shown in FIG. 1. Cuttings 15 produced as a result of punching are removed (FIG. 4(E)). The IC tag label 1A according to the first embodiment of the present invention is now completed. The manufacturing process described above can also be performed by using an automated production line for a conventional IC tag label.

The manufacturing process for the IC tag label 1B according to the second embodiment is similar to the manufacturing process for the first embodiment except that a lamination step of attaching the IC chip protection sheet 4 is eliminated.

EXAMPLE 1

(Preparing the Inlet)

A transparent biaxially-stretched polyethylene terephthalate (PET) film of 65 mm wide and 25 μm thick was used as the inlet substrate 11. A 25 μm thick aluminum foil was dry-laminated to the inlet substrate 11 to produce a web material. A print resist was then used to print a coiled antenna pattern onto the web material. Next, after etching was conducted to leave the antenna pattern 2, the conductive member 8 was mounted on the ends 2*a*, 2*b*, and the antenna pattern 2 shown in FIG. 5 was completed. The external size of the antenna pattern 2 was such that it measured approximately 45 mm by 76 mm. A plurality of antenna patterns 2 were positioned at intervals of 88 mm. The IC chip 3 having a planar size of 1.0 mm square, a thickness of 120 μm, and a spike-like bump was mounted in a face-down manner on both ends 2*a*, 2*b* of the antenna pattern 2 under thermal pressure to complete the inlet 10 in a continuous strip form (FIG. 4(A)).

(Preparing the Release Paper Having an Adhesive Layer)

A kraft paper based release paper 7 of 75 mm wide and 120 μm thick, which was coated with an adhesive layer 6 of 30 μm thick (150 μm in total thickness), was prepared with 5 mm diameter circular openings 12 made at the portions to be directly below the IC chips 3. A plurality of openings 12 were positioned at intervals of 88 mm. The opening 12 was made with a rotary die cutter.

(Manufacturing the IC Tag Label)

An adhesive process was performed so that the prepared release paper 7 with an adhesive layer was pressure-bonded to an opposite side of the surface on which the antenna pattern 2 of the inlet 10 is disposed. Control was exercised so as to position the IC chip 3 at the center of the opening 12 (FIG. 4(B)). Next, the inlet 10 was reversed (FIG. 4(C)). Then, the IC chip protection sheet (20 μm thick PET sheet) 4 was laminated to the antenna pattern 2 side surface of the inlet 10 via the protection sheet bond 5. Subsequently, the portion disposed upper side of the release paper 7 in the thickness direction was punched with a die cutter to produce a label that measured 54 mm by 82 mm. A plurality of IC tag labels 1A, which were joined side by side, were completed (FIG. 4(D)). The above process was performed with an IC tag processing machine.

EXAMPLE 2

In Example 2, the IC tag label was processed in the same manner and with the same materials as in Example 1. However, a plurality of IC tag labels 1B, which were joined side by side, were produced by punching them to produce labels measuring 54 mm by 82 mm without attaching the IC chip protection sheet 4 thereto.

The noncontact IC tag labels according to Example 1 and 2 were used for testing purposes under the same conditions as those for the conventional IC tag labels. The obtained test results indicate that a failure caused by IC chip breakage is remarkably reduced in the state that the IC tag labels are joined side by side.

Furthermore, in the state that the IC tag labels are in the form of a wound product, the test results indicate that the IC chip is less likely to become damaged due to strong pressure exerted by winding during manufacture or after completion of production.

The invention claimed is:

1. An IC tag label comprising:

an inlet substrate;

an antenna pattern and an IC chip which are mounted on one surface of the inlet substrate;

an adhesive layer which is mounted on the other surface of the inlet substrate;

wherein a clearance for the IC chip is provided at least in a portion of the adhesive layer, the portion corresponding to the IC chip, wherein the adhesive layer is provided with a release paper, and the clearance for the IC chip is provided in a portion of the release paper and adhesive layer, the portion corresponding to the IC chip, and wherein an opening that serves as the clearance for the IC chip is provided in a portion of the release paper and adhesive layer, the portion corresponding to the IC chip.

2. An IC tag label comprising:

an inlet substrate;

an antenna pattern and an IC chip which are mounted on one surface of the inlet substrate, and an adhesive layer which is mounted on the other surface of the inlet substrate;

wherein a clearance for the IC chip is provided at least in a portion of the adhesive layer, the portion corresponding to the IC chip, wherein the adhesive layer is provided with a release paper, and the clearance for the IC chip is provided in a portion of the release paper and adhesive layer, the portion corresponding to the IC chip, and wherein a cut-out that is extended to one end edge of the release paper and adhesive layer to provide the clearance for the IC chip is made in a portion of the release paper and adhesive layer, the portion corresponding to the IC chip.

3. The IC tag label according to claim 1, wherein an IC chip protection sheet is mounted on one surface of the inlet substrate to cover the antenna pattern and the IC chip.

4. The IC tag label according to claim 3, wherein the IC chip protection sheet includes a plastic sheet and a protection sheet bond layer or adhesive layer, and has a thickness between 40 nm and 200 nm.

5. The IC tag label according to claim 3, wherein the IC chip protection sheet includes a paper substrate and a protection sheet bond layer or adhesive layer, and has a thickness between 40 nm and 200 nm.

6. The IC tag label according to claim 1, wherein the thickness of the release paper and adhesive layer is between 80 μm and 200 μm.

7. The IC tag label according to claim 2, wherein an IC chip protection sheet is provided on one surface of the inlet substrate to cover the antenna pattern and the IC chip.

8. The IC tag label according to claim 2, wherein the thickness of the release paper and adhesive layer is between 80 μm and 200 μm.

* * * * *